US006112102A

United States Patent [19]
Zhinong

[11] Patent Number: 6,112,102
[45] Date of Patent: *Aug. 29, 2000

[54] MULTI-BAND NON-UNIFORM HELICAL ANTENNAS

[75] Inventor: Ying Zhinong, Lund, Sweden

[73] Assignee: Telefonaktiebolaget LM Ericsson, Stockholm, Sweden

[ * ] Notice: This patent is subject to a terminal disclaimer.

[21] Appl. No.: 08/725,507

[22] Filed: Oct. 4, 1996

[51] Int. Cl.[7] ...................................................... H04B 1/00
[52] U.S. Cl. ........................................... 455/550; 455/899
[58] Field of Search .................................... 343/895, 702, 343/745, 749; 379/59; 455/575, 550, 267, 272

[56] References Cited

U.S. PATENT DOCUMENTS

| | | | |
|---|---|---|---|
| 2,993,204 | 7/1961 | Macalpine | 343/745 |
| 3,573,840 | 4/1971 | Gouillou | 343/895 |
| 4,012,744 | 3/1977 | Greiser | 343/895 |
| 4,137,534 | 1/1979 | Goodnight | 343/752 |
| 4,161,737 | 7/1979 | Albright | 343/749 |
| 4,356,492 | 10/1982 | Kaloi | 343/700 |
| 4,571,595 | 2/1986 | Phillips et al. | 343/745 |
| 4,723,305 | 2/1988 | Phillips et al. | 455/89 |
| 4,742,359 | 5/1988 | Ishino et al. | 343/895 |
| 5,216,436 | 6/1993 | Hall et al. | 343/895 |
| 5,311,201 | 5/1994 | Lillie et al. | 343/791 |
| 5,353,036 | 10/1994 | Baldry | 343/702 |
| 5,363,114 | 11/1994 | Shoemaker | 343/828 |
| 5,386,203 | 1/1995 | Ishihara | 455/82 |
| 5,451,974 | 9/1995 | Marino | 343/895 |
| 5,479,178 | 12/1995 | Ha | 343/702 |
| 5,532,703 | 7/1996 | Stephens et al. | 343/702 |
| 5,892,480 | 4/1999 | Killen | 343/385 |

FOREIGN PATENT DOCUMENTS

| | | | |
|---|---|---|---|
| 522 806 | 1/1993 | European Pat. Off. . | |
| 644 606 | 3/1995 | European Pat. Off. . | |
| 6-37531 | 10/1994 | Japan . | |
| 10-173430 | 6/1998 | Japan | H01Q 5/01 |
| 2175748 | 12/1986 | United Kingdom . | |

OTHER PUBLICATIONS

J. D. Kraus, "Antennas", pp. 173–178 (1950).
R. C. Hansen, "Microwave Scanning Antennas", pp. 116–122 (1950).

*Primary Examiner*—Reinhard J. Eisenzopf
*Assistant Examiner*—Makoto Aoki
*Attorney, Agent, or Firm*—Burns, Doane, Swecker & Mathis, L.L.P.

[57] ABSTRACT

According to exemplary embodiments of the present invention, non-uniform helical antennas are described for use in two or more frequency hyperbands. For example, non-uniform helical antennas can be designed according to the present invention for usage in portable terminals capable of operating both at 800 MHz and at 1900 MHz. Tuning to both resonance frequencies can be accomplished by varying parameters of the helical antennas including, for example, the pitch angle, coil diameter, length and number and spacing of the coil turns.

19 Claims, 12 Drawing Sheets

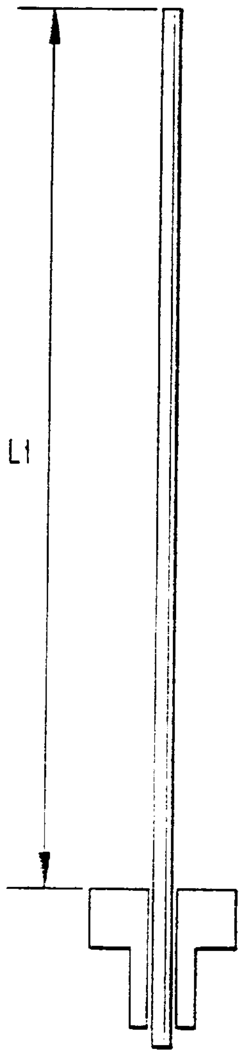
FIG. 5A
FIG. 5B
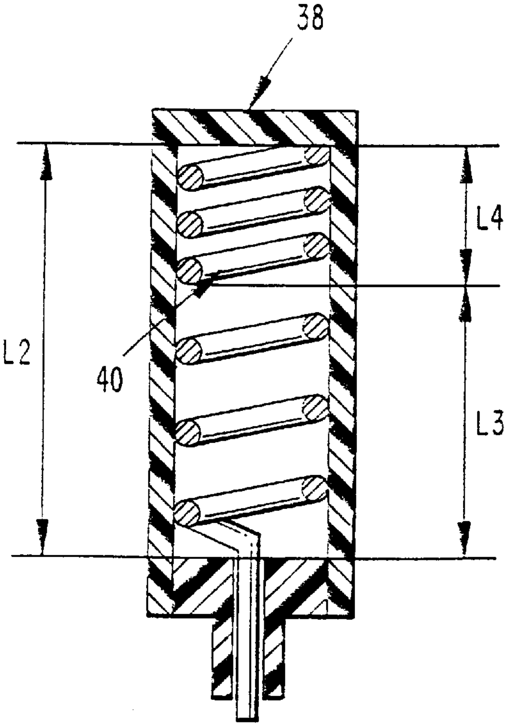

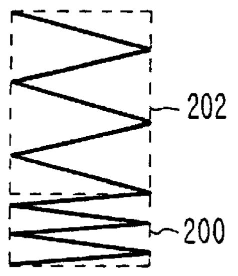
FIG. 12A
FIG. 12B
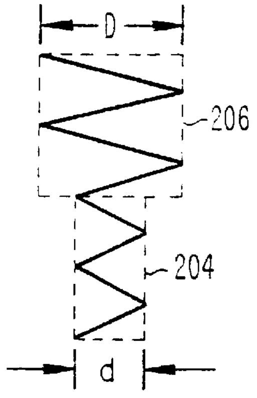
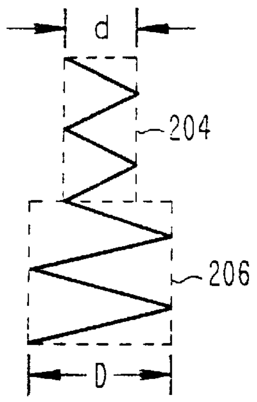
FIG. 12C
FIG. 12D
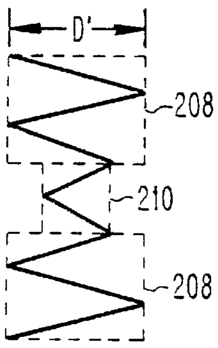
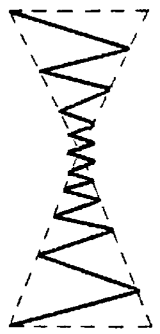
FIG. 12E

MULTI-BAND NON-UNIFORM HELICAL ANTENNAS

BACKGROUND

The present invention relates generally to radio communications systems and, in particular, to antennas which can be incorporated into portable terminals and which allow the portable terminals to communicate within different frequency bands.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communications services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States of America to include six different frequency bands (A, B, C, D, E and F) in the 1900 MHz region. Thus, eight frequency bands are now available in any given service area of the U.S. to facilitate communications services. Certain standards have been approved for the PCS hyperband (e.g., PCS1900 (J-STD-007), CDMA (IS-95) and D-AMPS (IS-136)), while others have been approved for the Cellular hyperband (e.g., AMPS (IS-54)).

Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, handoff, and cell selection or reselection instructions as a mobile station travels out of the radio coverage of one cell and into the radio coverage of another cell. The control or voice channels may operate in either an analog mode, a digital mode, or a combination mode.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedances and relatively simple construction. Monopole antennas can be created in various physical forms. For example, rod or whip antennas have frequently been used in conjunction with portable terminals. For high frequency applications where an antenna's length is to be minimized, another choice is the helical antenna. As seen in FIG. 1, a helical antenna allows the design to be shorter by coiling the antenna along its length.

In order to avoid losses attributable to reflections, antennas are typically tuned to their desired operating frequency. Tuning of an antenna refers to matching the impedance seen by an antenna at its input terminals such that the input impedance is seen to be purely resistive, i.e., it will have no appreciable reactive component. Tuning can, for example, be performed by measuring or estimating the input impedance associated with an antenna and providing an appropriate impedance matching circuit.

As described above, it will soon be commercially desirable to offer portable terminals which are capable of operating in widely different frequency bands, e.g., bands located in the 900 MHz region and bands located in the 1800 MHz region. Accordingly, antennas which provide adequate gain and bandwidth in both frequency bands will need to be employed in portable terminals in the near future. Several attempts have been made to create such dual band antennas.

For example, U.S. Pat. No. 4,571,595 to Phillips et al. describes a dual band antenna having a sawtooth shaped conductor element. The dual band antenna can be tuned to either of two closely spaced apart frequency bands (e.g, centered at 915 MHz and 960 MHz). This antenna design is, however, relatively inefficient since it is so physically close to the chassis of the mobile phone.

U.S. Pat. No. 4,356,492 to Kaloi describes a multi-band microstrip antenna including a plurality of separate radiating elements which operate at widely separated frequencies from a single common input point. However, these radiating elements are directly connected with each other and require a ground plane which fully covers the opposite side of a dielectric substrate from such radiating elements. Thus, the design of Kaloi is impractical for monopole antenna applications and, in fact, functions in a completely different manner.

U.S. Pat. No. 5,363,114 to Shoemaker discloses a planar serpentine antenna which includes a generally flat, non-conductive carrier layer and a generally flat radiator of a preselected length arranged in a generally serpentine pattern secured to the surface of the carrier layer. One form of this antenna has a sinuous pattern with radiator sections in parallel spaced relation to provide dual frequency band operation. However, it is seen that the two frequencies at which resonance takes place involves the length of each radiator section and the total length between first and second ends. While this arrangement may be suitable for its intended purpose, it is incapable of operating in the manner of a monopole antenna.

Accordingly, it would be desirable for an antenna design to have the desirable characteristics of a monopole antenna and be relatively compact in size for usage in portable terminals. Moreover, it would further be desirable that such an antenna be tuned to two (or more) frequency bands for compatibility with various, overlapping radio communication systems.

SUMMARY

According to exemplary embodiments of the present invention, portable terminals are provided with dual band antennas created using non-uniform helical structures. In this way, dual band antennas are created which have a high efficiency and which are small in size, e.g., about one-third the height of conventional whip antennas with the same gain.

Exemplary embodiments of the present invention provide different types of non-uniform helical antennas which can be used in conjunction with portable terminals. For example, according to a first exemplary embodiment, a non-uniform helical antenna is described wherein the helical antenna has a constant diameter but has coils with different pitch angles.

According to a second exemplary embodiment, dual band antennas include helical segments having differing diameters. According to a third exemplary embodiment, antennas include helices shaped as conical spirals.

Another object of the present invention is to provide techniques for tuning the dual band antennas to each of the two (or more) resonant frequencies desired by changing the parameters of the helices. Such parameters include, for example, length, number of turns, pitch angle and diameter of the helices.

Still another object of the present invention is to provide dual band antennas which are easier to manufacture than conventional dual band antennas.

BRIEF DESCRIPTION OF THE DRAWINGS

The foregoing, and other, objects, features and advantages of the present invention will be more readily understood upon reading the following detailed description in conjunction with the drawings in which:

FIG. 5A illustrates the wire length of an antenna;

FIGS. 5B–5D show various parameters of non-uniform helices;

FIGS. 12A–12E show various alternative configurations for non-uniform helical antennas according to the present invention.

DETAILED DESCRIPTION

Figure 1:
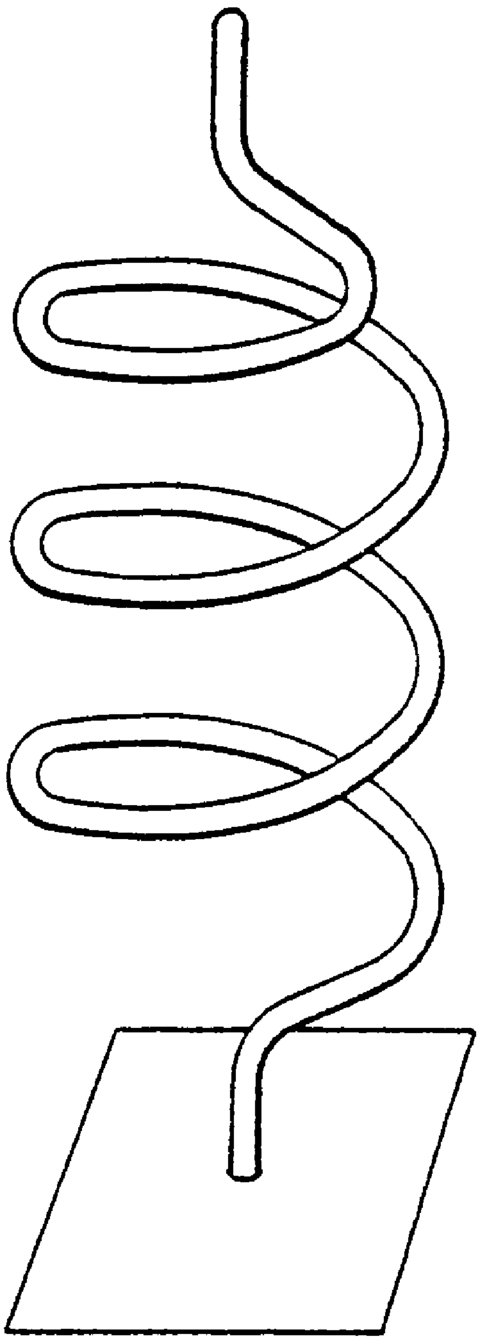
FIG. 1 illustrates a conventional helical antenna.

Prior to describing antennas, and portable terminals including antennas, according to the present invention, a brief overview is provided below of dual-band systems to provide some context for the present invention. A "hyperband", as the term is used in this application, refers to a group of frequencies or frequency bands that is widely spaced apart from a group of frequencies or frequency bands associated with other hyperbands. Thus, each hyperband may itself include frequency bands which are somewhat more closely spaced together. For example, in the AMPS standard promulgated for the United States, the cellular hyperband includes a frequency band for downlink channels and a frequency band for uplink channels. Although the present invention is described in the context of dual hyperband antennas and portable terminals, those skilled in the art will appreciate the following techniques can be extended to allow operation in three or more different hyperbands, e.g., by adding additional turns to the helical structure and tuning the structure to three or more different resonant frequencies Reference is now made to FIG. 2 wherein there is shown a cell diagram illustrating an exemplary cell configuration having different networks and network operators in which two frequency hyperbands are employed to provide radio communication service. Therein, an arbitrary geographic area is divided into a plurality of cells 10–18 controlled by a first operator or service company and cells 20–26 controlled by a second operator or service company. The first and second operators provide radio communication services utilizing first and second frequency hyperbands, respectively. For example, cells 10–18 are represented by hexagrams and comprise communications cells wherein communications are provided via multiple channels using a DCS frequency hyperband, e.g. in the 1800 Mhz range. Cells 20–26, on the other hand, are represented by circles and comprise communications cells in which cellular communications are provided to mobile stations via multiple channels according in a GSM frequency hyperband, e.g., in the 900 Mhz range.

Each of the DCS cells 10–18 includes at least one base station 28 configured to facilitate communications over certain channels in the DCS frequency hyperband. Similarly, each of the cells 20–26 includes at least one base station 30 configured to facilitate communications over certain channels in the GSM frequency hyperband. It will, of course, be understood that each cell 10–18 and each cell 20–26 may include more than one base station 28 and 30, respectively, if for example, different service companies are providing GSM communications services on different frequency bands within each hyperband in the same cell.

The base stations 28 and 30 are illustrated as being positionally located at or near the center of each of the cells 10–18 and 20–26, respectively. However, depending on geography and other known factors, either or both of the base stations 28 and 30 may instead be located at or near the periphery of, or otherwise away from the centers of, each of the cells 10–18 and 20–26. In such instances, the base stations 28 and 30 may broadcast and communicate with mobile stations 32 located within the cells 10–18 and 20–26 using directional rather than omni-directional antennas. Each one of the base stations 28 and 30 includes a plurality of transceivers connected to one or more antennas in a manner and with a configuration well known in the art.

Figure 2:
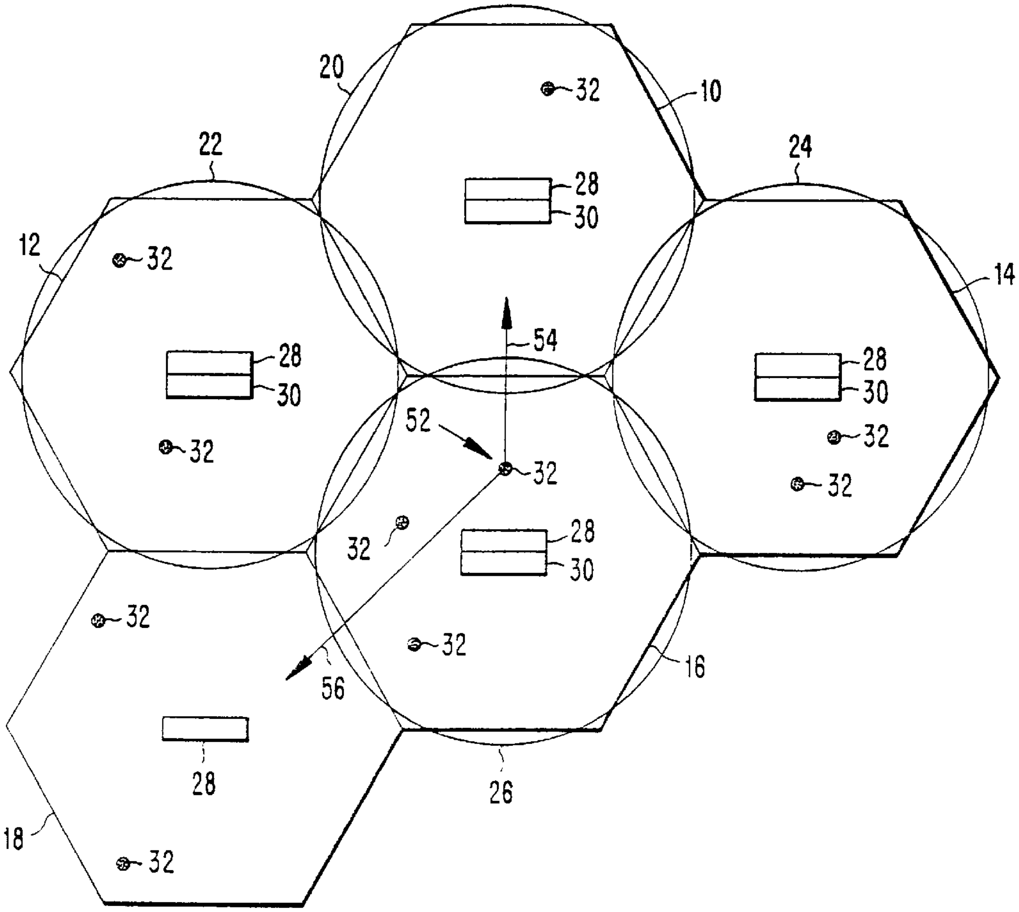
FIG. 2 depicts overlapping radio communication systems operating in different frequency bands.

There are a number of mobile stations 32 shown operating within the service areas illustrated in FIG. 2. These mobile stations 32 each possess the requisite functionality for operating in at least both the GSM frequency hyperband and the DCS frequency hyperband (i.e., they are multiple hyperband communications capable) and are capable of operating in different modes, e.g., analog or digital modulation. The configuration and operation of the mobile stations 32 will be described in more detail herein with respect to FIG. 3.

Figure 3:
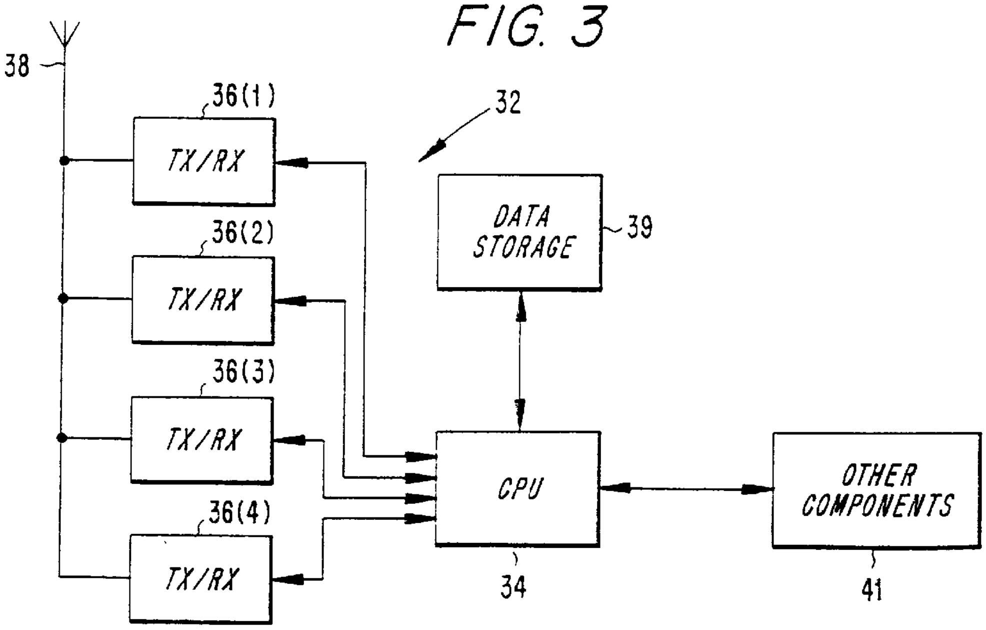
FIG. 3 is a simplified block diagram of a multiple hyperband/mode mobile station programmable with hyperband and frequency band selection criteria in accordance with the present invention.

Reference is now made to FIG. 3 wherein there is shown a simplified block diagram of a multiple hyperband, multiple mode mobile station 32 according to an exemplary embodiment of the present invention. The mobile station 32 includes a processor (CPU) 34 connected to a plurality of transceivers 36. The transceivers 36 are each configured to operate in the frequency bands and channels of a different hyperband. For example, the transceiver 36(1) functions on multiple channels in at least one of the frequency bands of the 900 MHz frequency range, and is thus utilized by the mobile station 32 for communicating over the GSM hyperband. The transceiver 36(2), on the other hand, functions on multiple channels in at least one of the frequency bands of the 1800 MHz frequency range, and is thus utilized by the mobile station 32 for communicating over the DCS hyperband. The remaining transceivers 36(3) and 36(4), if included, function in other frequency ranges; for example, comprising those additional frequency ranges identified for other soon to be made available hyperbands. Those skilled in the art will appreciate that an exemplary embodiment of the present invention can include only transceivers 36(1) and 36(2) to reduce the cost of the unit. Alternatively, it may be possible to use one transceiver capable of operating in either band, e.g., 900 MHz or 1800 MHz. By means of an output signal from the processor 34, the frequency band and precise channel therein on which the transceivers 36 operate for communications may be selected. Additionally, each transceiver can be adapted as a dual mode analog/digital transceiver. Such devices are described, for example, in U.S. patent application Ser. No. 07/967,027, entitled "Multi-Mode Signal Processing" to Paul W. Dent et al and filed on Oct. 27, 1992, the disclosure of which is incorporated here by reference. In this way, each of the mobile stations 32 can communicate with different types of networks which it may encounter while roaming, e.g., PCS1900 and AMPS.

An antenna 38 is connected to the transceivers 36 for transmitting and receiving radio communications (both voice and data) over the cellular communications network utilizing, for example, the base stations 28 and 30 of FIG. 2. According to exemplary embodiments of the present invention, the antenna 38 can be formed as a non-uniform, helical antenna as described in more detail below. A data storage device 39 (preferably in the form of a read only memory—ROM—and a random access memory—RAM) is also connected to the processor 34. The data storage device 39 is used for storing programs and data executed by the processor 34 in controlling operation of the mobile station 32. There are other components 41 included in the mobile station 32 (like a handset, keypad, etc.) and not specifically shown in FIG. 3 whose nature, operation and interconnection with the illustrated components are well known to those skilled in the art.

Figure 4A:
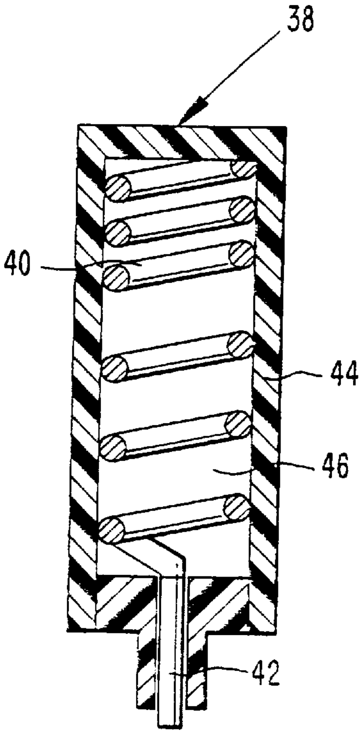
FIG. 4A illustrates an exemplary non-uniform helical antenna structure according to the present invention.
Figure 4B:
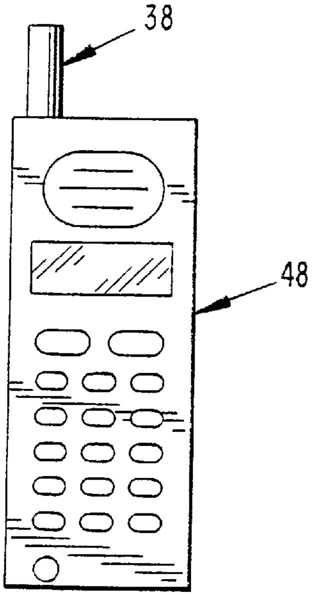
FIG. 4B depicts a remote unit including the exemplary non-uniform helical antenna structure of FIG. 4A.

Exemplary embodiments of antenna 38 according to the present invention can be designed as non-uniform helical structures which are tuned to two or more resonant frequencies. For example, antenna 38 can be designed as illustrated in FIG. 4A. Therein, antenna 38 includes non-uniform helix 40, coaxial feed cable 42, plastic seal 44 and plastic filler material 46 disposed between the coils of helix 40. This antenna 38 can then be mounted on a remote unit 48 (e.g., mobile phone) as shown in FIG. 4B.

Figure 5C:
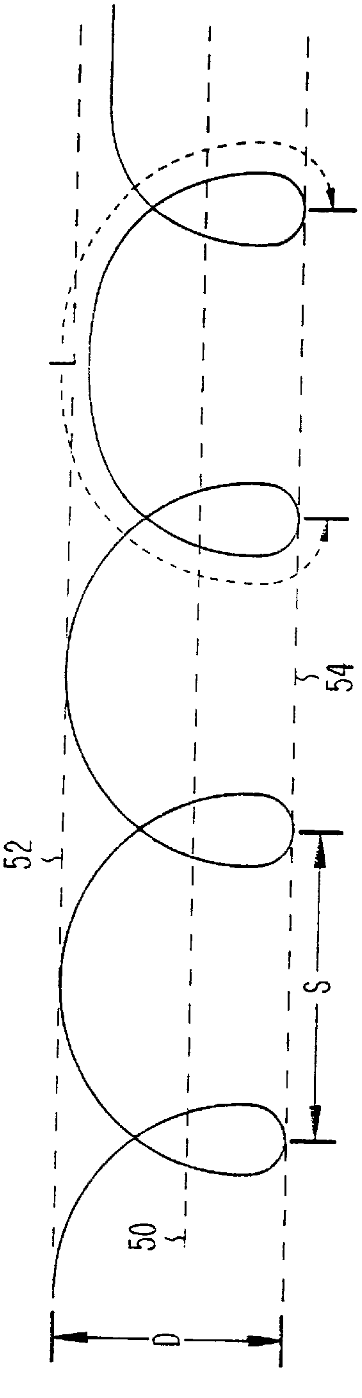
Figure 5D:
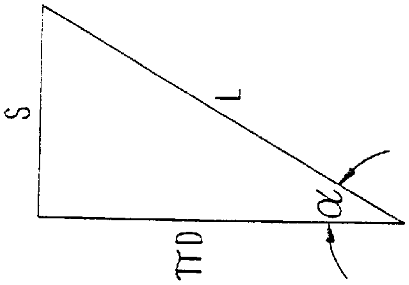

Techniques for tuning non-uniform helical antennas to two (or more) resonance frequencies according to the present invention are based on the principle of changing the distributed capacitance and inductance of the antenna to obtain the two (or more) desired resonant frequencies. More specifically, the physical parameters of the non-uniform helical structure are adjusted in order to change the distributed capacitance and inductance. These parameters will now be discussed with the aid of FIGS. 5A–5D. FIG. 5A depicts the wire used to create a helical structure according to the present invention, but in its uncoiled state. This wire has length L1, which is significant because the lower resonant frequency of dual band non-uniform helical structures according to the present invention is dependent upon L1, because the helical structure operates as a quarter wavelength monopole antenna at the lower resonant frequency. Thus, to create a dual band non-uniform helical antenna according to the present invention which is tuned to, for example, 900 MHz as a lower resonant frequency, L1 could be chosen to be about 83 mm.

To compact the antenna 38, it is coiled into a helix 40 as illustrated, for example, in FIG. 5B. This results in a helix length L2 which can be, for example, about 20 mm using the wire length L1 of about 83 mm. As can be seen in FIG. 5B, however, the helix 40 is non-uniform, i.e., section L3 differs from section L4. In this particular example, the pitch angle of section L3 is smaller than that of section L4.

The reason for using non-uniform helical structures in antennas according to the present invention is to be able to selectively tune the antenna to a second resonant frequency. If the helical structure was uniform, i.e, constant pitch angle and constant helix diameter along its length, then the second resonant frequency would typically occur at about three-quarters of a wavelength. In the example described here, where the length L1 was selected to result in a lower resonant frequency of 900 MHz, this would result in a high resonant frequency of 2700 MHz. However, it will normally be desirable to tune the antenna to some other high resonant frequency. For example, as described above, it may be desirable to have a high resonant frequency of about 1800 MHz instead of 2700 MHz, if a remote unit designer wants to tune the antenna for usage in the DCS system.

A first step in tuning non-uniform helical antennas according to exemplary embodiments of the present invention is to consider the effects of the remote unit's chassis on the high resonant frequency. Typically, the chassis will also act as an antenna which will tend to lower the high resonant frequency, for example from 2700 MHz to 2400 MHz in the example discussed above. To move the high resonant frequency even lower, it is thus desirable to increase the coupling (i.e., capacitive and inductive coupling) between the coils in the helical antenna structure. According to the present invention, this is accomplished by making the helical structure non-uniform, e.g., by varying the pitch angle and/or the helix diameter. These helical parameters will now be described in more detail.

A helix is illustrated in FIG. 5C as having an axis depicted by dotted line 50. This portion of the helix has four coils or turns each of which have a turn length L. The coils or turns are each spaced apart from one another by a spacing distance S. The helix has a diameter D which is equivalent to an imaginary cylinder having a diameter given by the outer two dotted lines 52 and 54.

Another parameter which is commonly used to define a helix is its pitch parameter. If the helix is unrolled onto a flat plane, the relation between the coil spacing S, the coil length L and the helix diameter D is the right triangle illustrated as FIG. 5D. The pitch angle is illustrated therein and can be calculated as the arctangent of $S/D\pi$.

Adjusting these parameters for one or more segments of a helical antenna creates a non-uniform helical antenna that is selectively tuned to the desired high resonant frequency. For example, by making the pitch angle smaller along a segment of the helical structure, the capacitive coupling is increased which in turn lowers the high resonant frequency. Adjusting the diameter effects the bandwidth(s) of the resonant frequency(ies). In order to aid in understanding this technique, a specific example is provided below with respect to FIG. 6, however, those skilled in the art will appreciate that the numerical values are provided simply for illustration.

Figure 6:
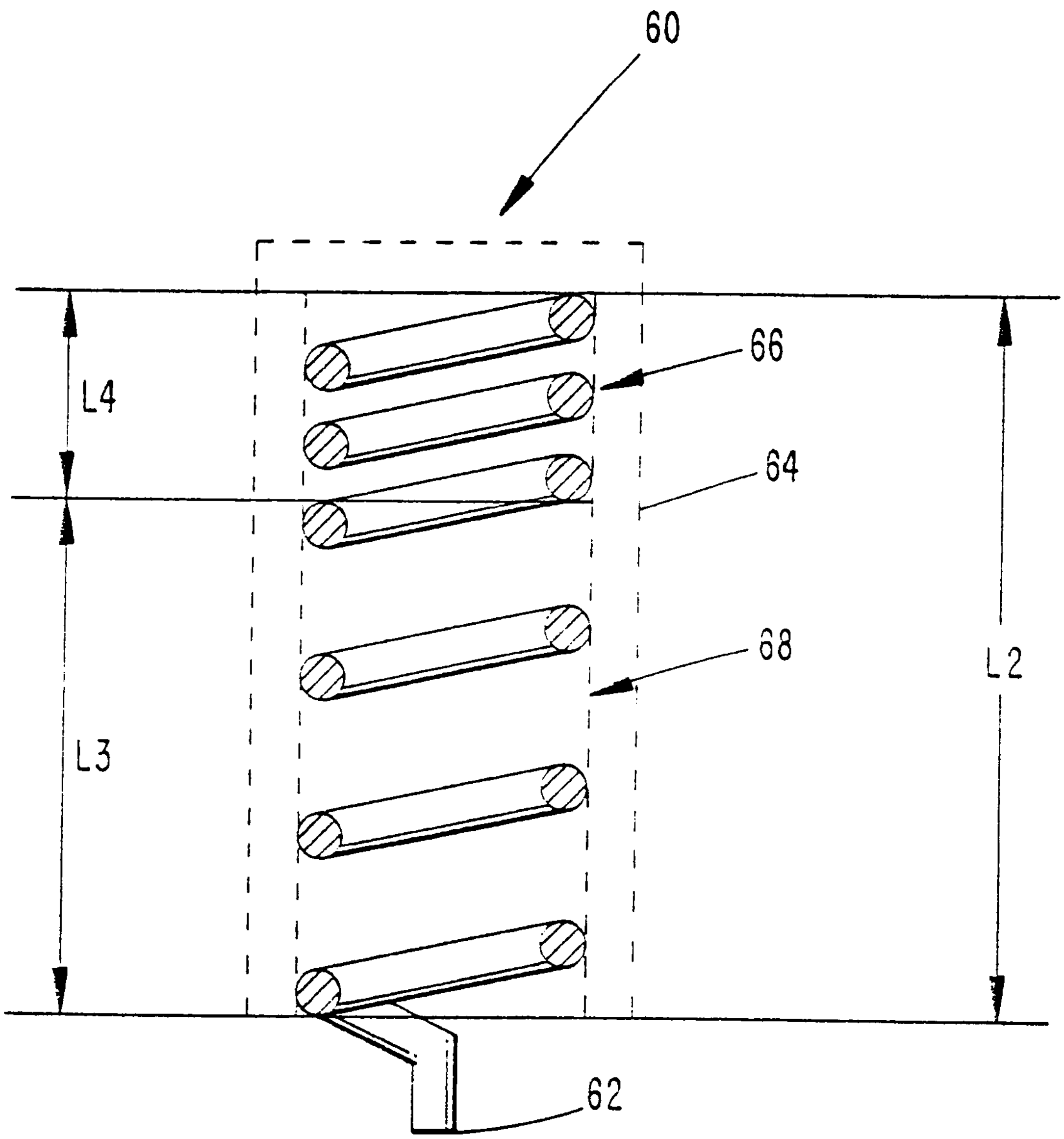
FIG. 6 depicts an exemplary dual band non-uniform helical antenna according to the present invention.

In the example of FIG. 6, a non-uniform helical antenna is tuned to suitable resonance frequencies (e.g., about 900 MHz and about 1800 MHz) so that a portable terminal employing this antenna is usable in both the 900 MHz region and the 1800 MHz region, e.g., with both GSM and DCS systems. The antenna 60 has a feed or source point 62 and is surrounded by a protective, plastic coating 64. As described above, the wire length L1 is selected to be about 83 mm in this example, so that the lower resonant frequency is about 900 MHz. Next, the length L2 is chosen based upon the desired height for the antenna structure. Various considerations may be factored into the selection of L2, for example, whether the antenna is to be retractable, the size of the remote unit's chassis, the intended usage of the remote unit, etc. One of the advantages of non-uniform helical antennas according to the present invention is the ability to select any length L2 and then adjust the helical parameters in accordance with this selection to tune the antenna to desired frequencies.

In this example, L2 is selected to be 20 mm. The next step is to lower the high resonant frequency from about 2400 MHz to about 1800 MHz. This is accomplished by providing a certain amount of capacitive coupling between helical turns, which amount can be determined iteratively by experimentation, as will be described below. In this example, the antenna 60 includes two helical sections 66 and 68. In order to provide sufficient capacitive coupling, it was determined experimentally that section 66 should have two turns and a pitch angle of about 4.5 degrees, resulting in a length L4 of 4 mm. Section 68 has a larger pitch angle of about 9 degrees and length L3 of 16 mm. The diameter of the resultant non-uniform helical structure is 9 mm.

Figure 7:
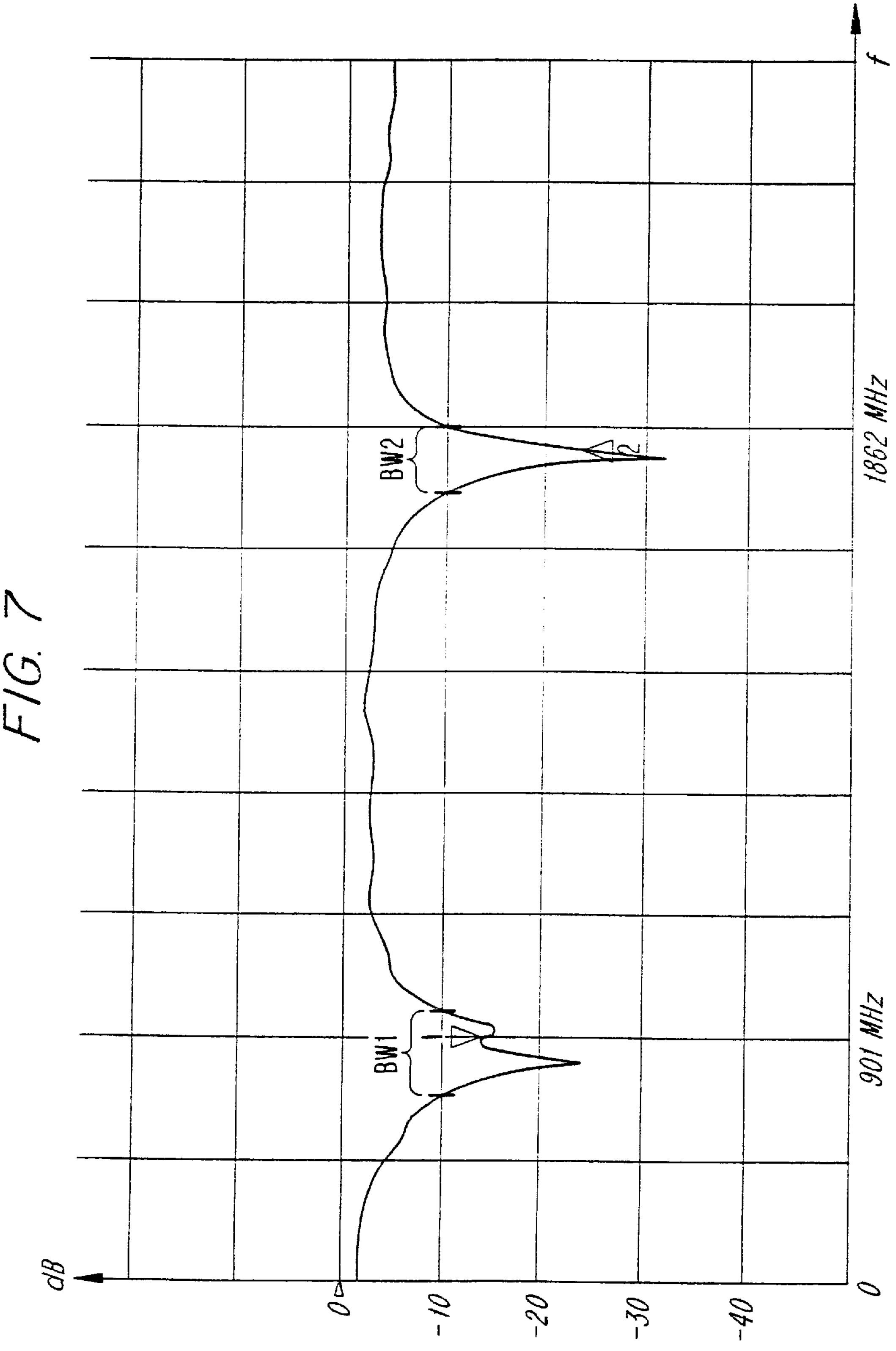
FIG. 7 is a graph illustrating the return loss of the antenna of FIG. 6 as a function of frequency.
Figure 8:
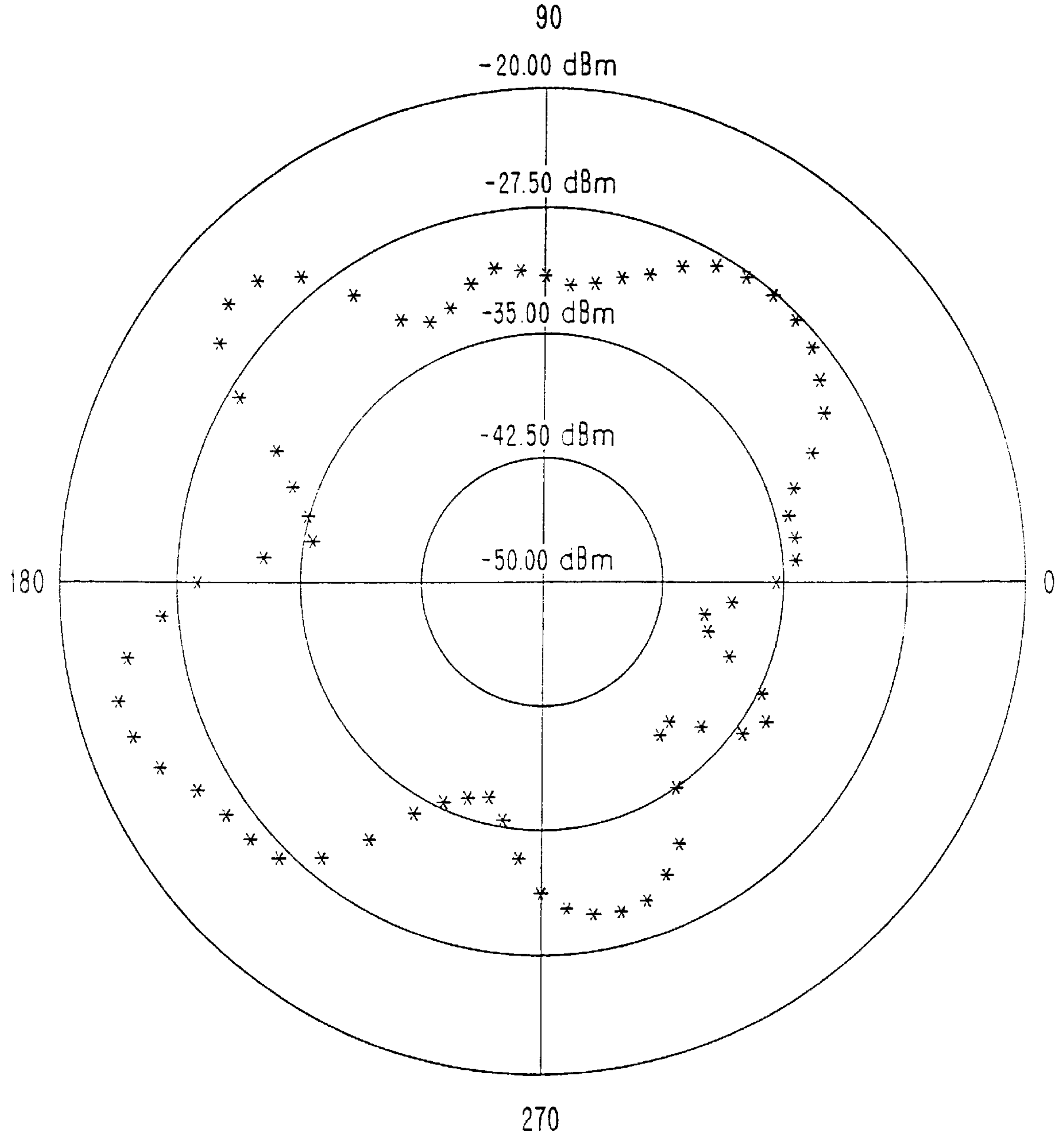
FIGS. 8 and 9 depict the radiation patterns of the antenna of FIG. 6 at 900 and 1810 MHz, respectively.
Figure 9:
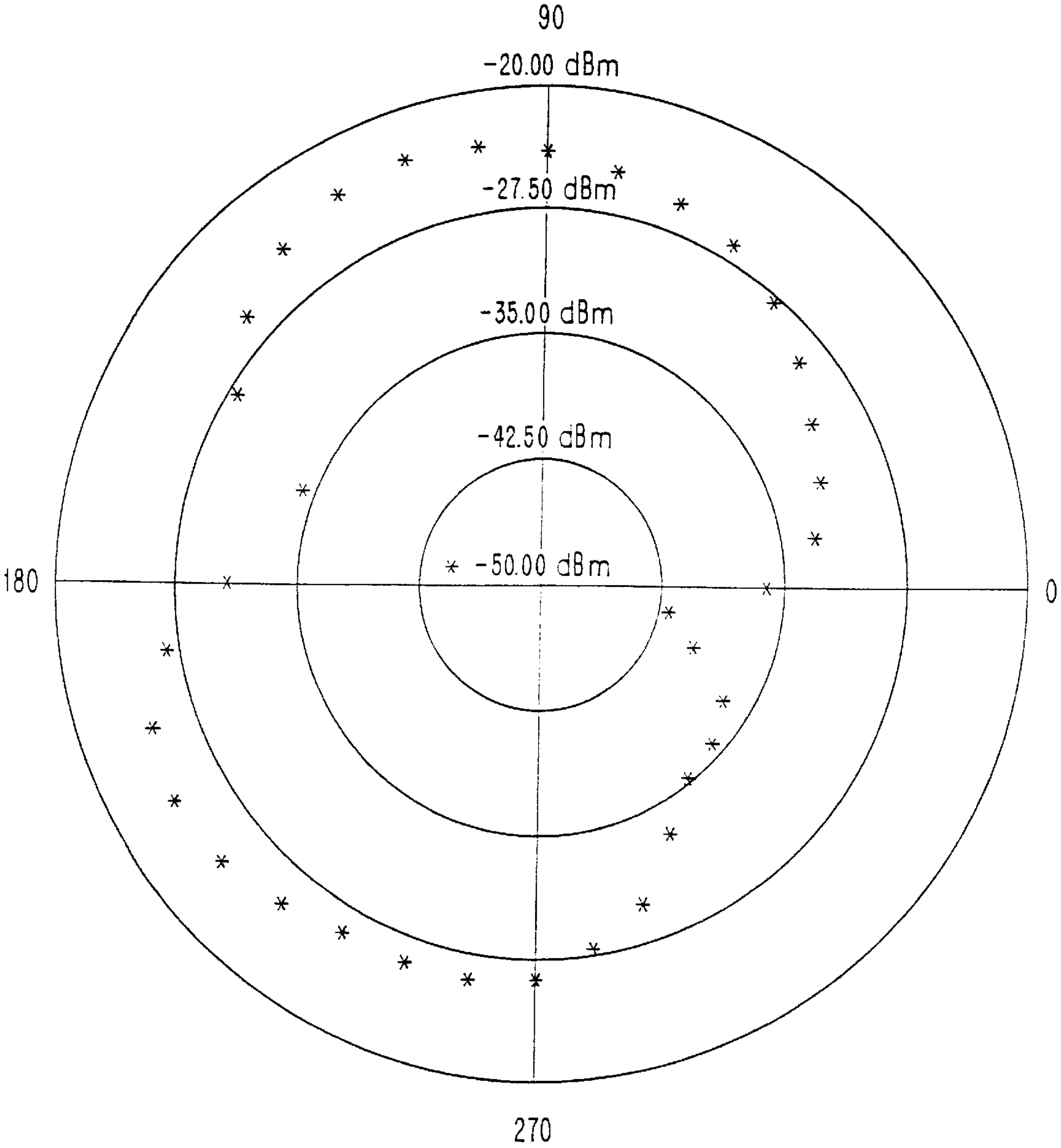

FIGS. 7–9 illustrate the performance of the exemplary non-uniform helical antenna of FIG. 6. In FIG. 7, the return loss vs. frequency graph shows that the antenna exhibits a response of about −14.48 dB at the first resonant frequency of about 900 MHz and about −23.62 dB at the second resonant frequency of about 1800 MHz. Moreover, the −10 dB bandwidth for each band is about 136 MHz (BW1) in the 900 MHz region and about 110 MHz (BW2) in the 1800 MHz region. This provides ample gain within a sufficiently wide bandwidth so that the antenna performance is acceptable for operation in accordance with both the GSM and DCS standards.

FIGS. 8 and 9 depict the antenna radiation pattern for the exemplary non-uniform dual band helical antenna of FIG. 6. Specifically, FIG. 8 illustrates the radiation pattern in the X-Z plane at 900 MHz at a transmit signal strength of 10 dBm, while FIG. 9 illustrates the radiation pattern in the X-Z plane at 1810 MHz at a transmit signal strength of 10 dBm. From these Figures, it can be seen that the antenna gain for this exemplary non-uniform helical antenna according to the present invention is about the same as that generated by conventional whip antennas, even though the size is about ⅓ that of such antennas.

Figure 10:
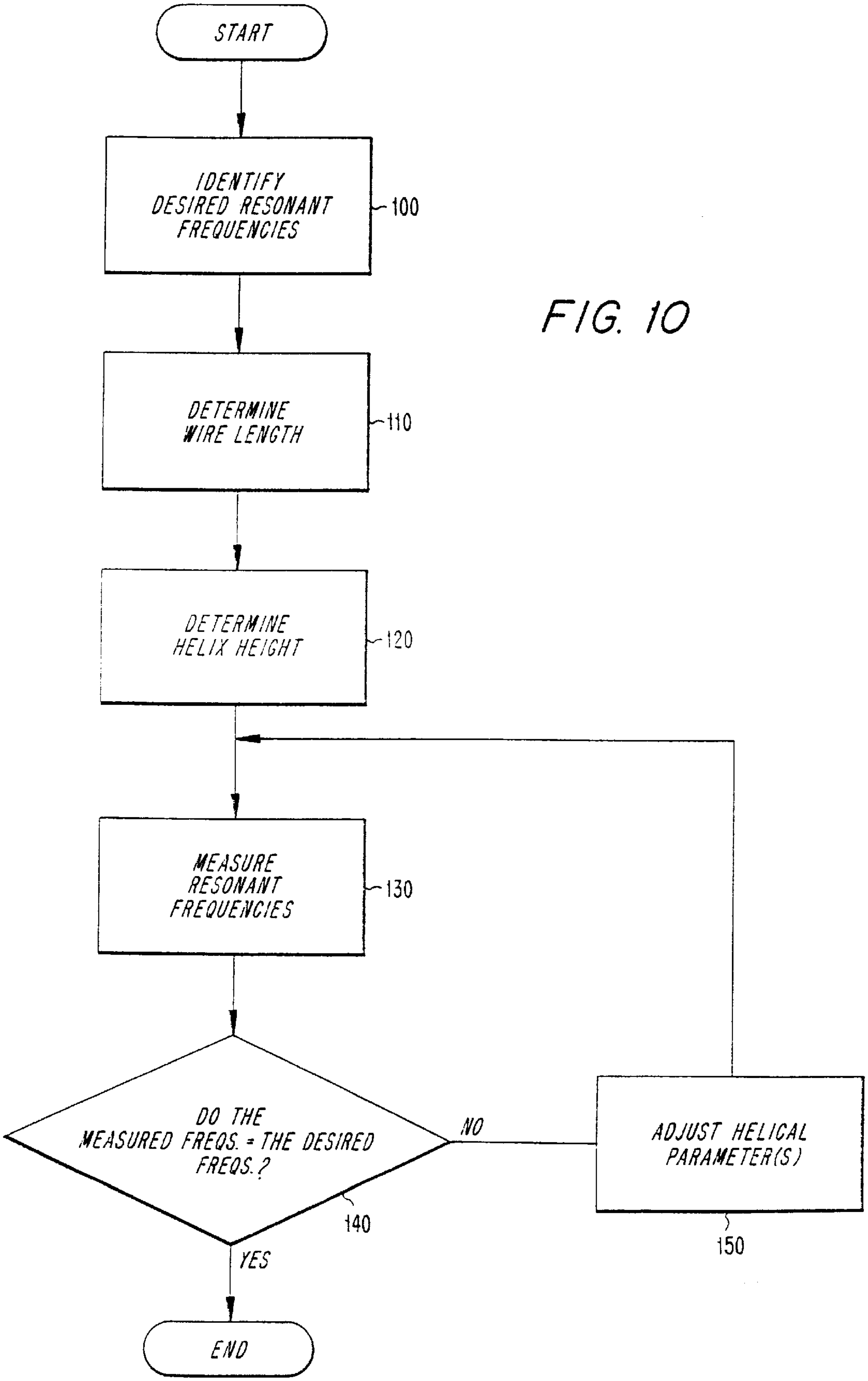
FIGS. 10 and 11 illustrate a flowchart that describes an exemplary method for tuning non-uniform helical antennas according to the present invention.

As mentioned above, techniques according to the present invention for tuning the non-uniform helical structures to the second (and any additional) resonant frequency is somewhat experimental and iterative in nature. These techniques can be generalized as follows. FIG. 10 is a flowchart depicting the general steps which can be used to tune non-uniform helical structures according to the present invention. Therein, at step 100, the desired resonant frequencies, for example 900 MHz and 1800 MHz are identified. Next, at step 110, the wire length for the non-uniform helical antenna is selected based upon the lowest desired resonant frequency. For example, the wire length can be determined primarily based on the relationship f(in MHz)=300/λ(in meters) and given that a quarter wavelength is desired. If, however, the helical antenna structure includes a dielectric filler (e.g., plastic or rubber) used to protect and seal the antenna, then the effect of this filler on the electrical length of the wire can also be considered as described below. At step 120, the helix height (e.g., L2 in FIG. 6) is selected based upon, for example, the design criteria described above.

After these parameters are established for the antenna structure, the experimentation steps begin. At block 130, one or more resonant frequencies of the helical structure are measured. As will be appreciated by those skilled in the art, this can be accomplished using a network analyzer. In the exemplary dual mode embodiments described above, typically only a single high resonant frequency would be measured. Then, at step 140, the measured resonant frequency (ies) are compared with the desired resonant frequency(ies) identified at step 100. If the desired resonant frequency(ies) have been obtained, then the process ends. Otherwise, the flow proceeds to step 150 wherein one or more of the helical parameters described above are adjusted. For example, during the first iteration of this process using the example provided above, the high resonant frequency of the helical structure (prior to any modification) would be measured to be about 2400 MHz. Since the desired high resonance frequency in this example is 1800 MHz, an adjustment would be made, i.e., to decrease the capacitive coupling by increasing the pitch angle associated with one or more turns of the helix, and the process of blocks 130 and 140 would then be repeated.

Figure 11:
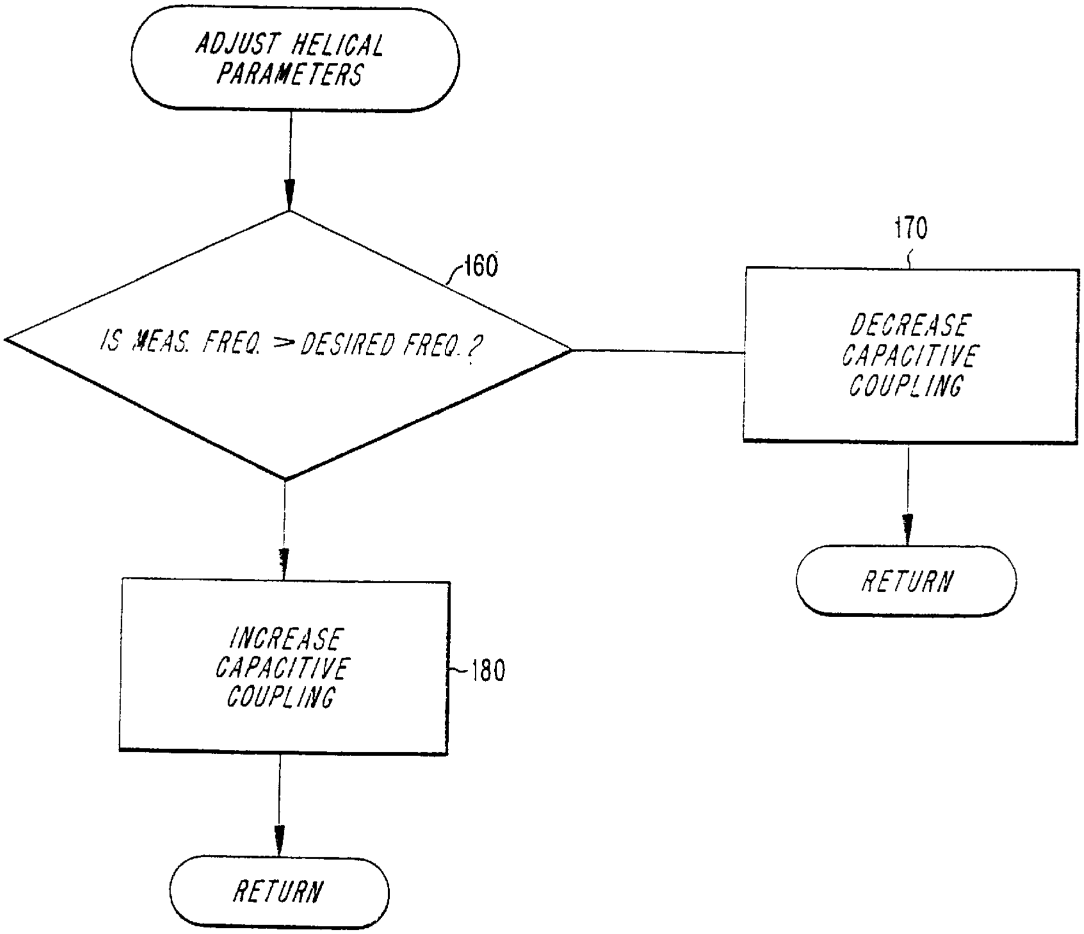

The adjustments made at step 140 depend upon, among other things, whether the measured resonant frequency(ies) is higher or lower than the desired resonant frequency(ies). FIG. 11 illustrates step 140 in more detail. If the measured resonant frequency(ies) is higher than the desired resonant frequency(ies) (as determined at step 160, then the overall capacitive coupling within the non-uniform helical structure should be decreased at step 170. Otherwise, the overall capacitive coupling should be increased at step 180. As will be apparent to those skilled in the art changing the capacitive coupling between helical turns can be accomplished by varying either the pitch angle or the diameter of the helix, since capacitive coupling is a function of distance between conductors and surface area of the conductors. Although the example provided in FIG. 6 shows changing only the pitch angle of the helix, it may be necessary to also vary the diameter due to the design constraint imposed by the selection of a particular helix length L2 and also due to a desire to provide certain bandwidths surrounding the desired resonant frequencies.

As shown in the example of FIGS. 6 and 7 above, the bandwidth at each tuned resonant frequency can be different. By positioning the longer section 68 having the larger pitch angle proximate the feed point 62 and the shorter section 66 having the smaller pitch angle more distantly, the bandwidth about the low resonant frequency of 900 MHz is greater than that of the bandwidth about the high resonant frequency of 1800 MHz.

Due to the number of different helical parameter adjustments which can be made at step 140 (e.g., changes to pitch angle and/or changes to helix diameter) and the number of different design constraints which impact the particular choice of adjustments (e.g., desired length (L2) of the helix, desired bandwidths at selected resonant frequencies, etc.), those skilled in the art will recognize that many different physical configurations of non-uniform helical antennas according to the present invention are possible. Some examples are shown in FIGS. 12A–12E and described below.

The examples illustrated in FIGS. 12A–12E do not explicitly show the feed point for the antenna but are oriented such that the feed point (source end) should be presumed to be at the lowermost point of each illustrated antenna. Thus, FIG. 12A depicts a non-uniform helical antenna in which the position of sections 200 and 202 have been reversed relative to configuration of FIG. 6. Thus, the section 200 having the smaller pitch angle is now proximate the source end, while the section 202 having the larger pitch angle is more distant from the source end. This configuration would provide a smaller bandwidth about the lower resonant frequency and a large bandwidth about the higher resonant frequency as compared with, for example, the bandwidths illustrated with FIG. 7.

In addition to varying the pitch angle parameter of the helices, the diameter of the helical coils can also be varied to tune antennas according to the present invention to two or more resonance frequencies. For example, in FIG. 12B, a first section 204 having a first diameter d is proximate the source end of the antenna and a second section 206 having a second diameter D is more distant from the source end. As is seen in the figure, the first diameter d is less than the second diameter D. Generally speaking, this configuration will tend to provide a larger bandwidth at the higher resonant frequency than at the lower resonant frequency. The sections can also be fabricated in reverse order (as shown in FIG. 12C) with section 206 having the greater coil diameter being disposed proximate the source end of the antenna, while section 204 having the lesser coil diameter is disposed more distantly. Thus, generally speaking, the configuration of FIG. 12C will tend to provide a larger bandwidth at the lower resonant frequency than at the higher resonant frequency.

Another exemplary, non-uniform configuration is illustrated in FIG. 12D. Therein, first and third helical antenna sections 208 have a first diameter D' and second helical antenna section 210, interposed therebetween, has a second diameter which is smaller than D'. According to yet another exemplary embodiment, shown in FIG. 12E, the non-uniform helical antenna can take the form of two conical spirals abutting one another at their narrowest points.

As alluded to above, non-uniform helical antennas according to the present invention can be encased in a material, e.g., plastic, to protect the antenna from bending and other damage. Additionally, as shown in FIG. 4A, the antenna can be embedded in a filler material, such as plastic or rubber, to further protect the antenna. Those skilled in the art will appreciate that the filler material will be a dielectric that will impact the electrical length of the antenna. Specifically, the dielectric will lower the resonant frequency (ies) of the antenna as compared with a similar antenna without the filler material. The impact of the filler material will be more dramatic with respect to the higher resonant frequencies because the dielectric loading will increase the coupling between the turns of the helix.

The above-described exemplary embodiments are intended to be illustrative in all respects, rather than restrictive, of the present invention. Thus the present invention is capable of many variations in detailed implementation that can be derived from the description contained herein by a person skilled in the art. For example although the present invention has been described with respect to operation in the GSM and DCS hyperbands, it will be understood that the disclosed invention may be implemented in and across any of a number of available hyperbands, e.g., AMPS (800 MHz region) and PCS (1900 MHz region) in the United States. All such variations and modifications are considered to be within the scope and spirit of the present invention as defined by the following claims.

What is claimed is:

1. A helical antenna tuned to a first and a second resonant frequency comprising:

only one elongated conductor formed as a spiral having a first section and a second section, wherein said elongated conductor has a length which is approximately one-quarter of a wavelength of said first resonant frequency;

said first section having a first pitch angle and said second section having a second pitch angle, said first pitch angle being different than said second pitch angle;

wherein said first and second pitch angles are selected to tune said helical antenna to said second resonant frequency.

2. The helical antenna of claim 1, wherein said elongated conductor has a source end and another end.

3. The helical antenna of claim 2, wherein said first pitch angle is greater than said second pitch angle.

4. The helical antenna of claim 3, wherein said first section is proximate said source end such that a bandwidth associated with said first resonant frequency is greater than a bandwidth associated with said second resonant frequency.

5. The helical antenna of claim 3, wherein said second section is proximate said source end such that a bandwidth associated with said second resonant frequency is greater than a bandwidth associated with said first resonant frequency.

6. A multiband helical antenna tuned to a first resonant frequency and a second resonant frequency comprising:

only one elongated conductor formed as a spiral having a first section and a second section;

said first section having a first coil diameter and said second section having a second coil diameter, said first coil diameter being different than said second coil diameter;

wherein said first and second coil diameters are selected to tune said helical antenna to said second resonant frequency.

7. The helical antenna of claim 6, wherein said elongated conductor further comprises a third section, said third section having said first coil diameter.

8. The helical antenna of claim 6, wherein said elongated conductor has a source end and another end.

9. The helical antenna of claim 8, wherein said first coil diameter is greater than said second coil diameter.

10. The helical antenna of claim 9, wherein said first section is proximate said source end.

11. The helical antenna of claim 9, wherein said second section is proximate said another end.

12. The helical antenna of claim 9, wherein said elongated conductor is shaped as two conical spirals.

13. The helical antenna of claim 6, wherein said elongated conductor has a length which is approximately one-quarter of a wavelength of said first resonant frequency.

14. A mobile station which can communicate with at least one first type of radio communication network that uses a first frequency hyperband and at least one second type of radio communication network that uses a second frequency hyperband, said mobile station comprising:

a dual hyperband, non-uniform helical antenna formed of a single conducting element;

a transceiver for transmitting and receiving signals using said dual hyperband, non-uniform helical antenna; and a processor for controlling said transceiver and processing said signals.

15. The mobile station of claim 14, wherein said dual hyperband, non-uniform antenna is tuned to a first resonant frequency and a second resonant frequency based upon physical parameters of said non-uniform helical antenna.

16. The mobile station of claim 15, wherein said physical parameters include at least one of pitch angle and helix diameter.

17. A helical antenna tuned to a first and a second resonant frequency comprising:

an elongated conductor formed as a spiral having a first section and a second section, wherein said elongated conductor has a length which is approximately one-quarter of a wavelength of the first resonant frequency, said first section having a first pitch angle and said second section having a second pitch angle, said first pitch angle being different than said second pitch angle wherein the first and second pitch angles are selected to tune said helical antenna to said second resonant frequency and wherein further the elongated conductor does not enclose a conducting element.

18. A multiband helical antenna tuned to a first resonant frequency and a second resonant frequency comprising:

an elongated conductor formed as a spiral having a first section and a second section;

said first section having a first coil diameter and said second section having a second coil diameter, said first coil diameter being different than said second coil diameter;

wherein said first and second coil diameters are selected to tune said helical antenna to said second resonant frequency and the spiral formed by the conductor is not wound around a conducting element.

19. A multiband helical antenna tuned to a first resonant frequency and a second resonant frequency comprising:

an elongated conductor formed as a spiral having a first section and a second section;

said first section having a first coil diameter and said second section having a second coil diameter, said first coil diameter being different than said second coil diameter;

wherein said first and second coil diameters are selected to tune said helical antenna to said second resonant frequency and the space within the spiral formed by the conductor does not include a conducting element.

* * * * *

UNITED STATES PATENT AND TRADEMARK OFFICE
CERTIFICATE OF CORRECTION

PATENT NO. : 6,112,102
DATED : August 29, 2000
INVENTOR(S) : Ying Zhinong

It is certified that error appears in the above-identified patent and that said Letters Patent is hereby corrected as shown below:

In section [75], correct the name of the inventor from "Ying Zhinong" to --Zhinong Ying--.

Signed and Sealed this

Nineteenth Day of June, 2001

*Attest:*

Nicholas P. Godici

NICHOLAS P. GODICI

*Attesting Officer* *Acting Director of the United States Patent and Trademark Office*